United States Patent
Mourad et al.

(10) Patent No.: US 10,033,493 B2
(45) Date of Patent: Jul. 24, 2018

(54) METHOD AND APPARATUS FOR TRANSMITTING/RECEIVING DATA STREAM IN WIRELESS SYSTEM

(75) Inventors: Alain Mourad, Middlesex (GB); Ismael Gutierrez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 3 days.

(21) Appl. No.: 13/614,061

(22) Filed: Sep. 13, 2012

(65) Prior Publication Data

US 2013/0064275 A1     Mar. 14, 2013

(30) Foreign Application Priority Data

Sep. 13, 2011   (GB) ................................... 1115833.4
Sep. 4, 2012    (KR) ......................... 10-2012-0097839

(51) Int. Cl.
*H04L 5/00*     (2006.01)
*H04W 28/06*    (2009.01)

(52) U.S. Cl.
CPC .......... *H04L 5/0023* (2013.01); *H04L 5/0091* (2013.01); *H04L 5/0053* (2013.01); *H04W 28/06* (2013.01)

(58) Field of Classification Search
CPC ... H04L 5/0023; H04L 5/0091; H04L 5/0053; H04L 5/0048
USPC ......................... 375/267, 260, 299, 347, 349
See application file for complete search history.

(56) References Cited

U.S. PATENT DOCUMENTS

| | | | |
|---|---|---|---|
| 2008/0008134 A1 | 1/2008 | Salou et al. | |
| 2009/0067522 A1* | 3/2009 | Kwak et al. | .................. 375/260 |
| 2009/0190677 A1 | 7/2009 | Jokela et al. | |
| 2009/0219860 A1 | 9/2009 | Tanno et al. | |
| 2009/0268679 A1 | 10/2009 | Suga | |
| 2009/0285185 A1 | 11/2009 | Hansen et al. | |
| 2010/0034219 A1* | 2/2010 | Stadelmeier et al. | ........ 370/478 |
| 2010/0061333 A1* | 3/2010 | Marsh et al. | ................. 370/330 |

(Continued)

FOREIGN PATENT DOCUMENTS

| | | |
|---|---|---|
| CN | 101926172 | 12/2010 |
| CN | 101933260 | 12/2010 |

(Continued)

OTHER PUBLICATIONS

Digital Video Broadcasting (DVB); Frame Structure Channel Coding and Modulation for a Second Generation Digital Terrestrial Television Broadcasting System (DVB-T2) ETSI EN 302 755 V1.2.1, Feb. 2011.

(Continued)

*Primary Examiner* — Kabir A Timory
(74) *Attorney, Agent, or Firm* — The Farrell Law Firm, P.C.

(57) ABSTRACT

Methods and apparatus are provided for transmitting and receiving data streams. The data streams are received. The data streams are mapped to a physical slot. At least one frame that includes the physical slot is formed. The at least one frame is transmitted through at least one radio frequency. The at least one frame is received through at least one radio frequency. A location of the physical slot included in each frame is obtained. The data streams allocated to the physical slot in the location are received. The physical slot includes bit information indicating a number of antennas transmitting the at least one frame.

16 Claims, 8 Drawing Sheets

(56) References Cited

U.S. PATENT DOCUMENTS

| | | | |
|---|---|---|---|
| 2011/0013718 A1 | 1/2011 | Ko et al. | |
| 2011/0044401 A1* | 2/2011 | Ko et al. | 375/295 |
| 2011/0131464 A1 | 6/2011 | Ko et al. | |
| 2012/0236880 A1 | 9/2012 | Stadelmeier et al. | |
| 2014/0093013 A1 | 4/2014 | Ouchi et al. | |
| 2015/0236718 A1 | 8/2015 | Ko et al. | |

FOREIGN PATENT DOCUMENTS

| | | |
|---|---|---|
| EP | 2 357 745 | 8/2011 |
| EP | 2 536 131 | 12/2012 |
| JP | 58-60846 | 4/1983 |
| JP | 2008-017096 | 1/2008 |
| JP | 2009-267986 | 11/2009 |
| JP | 2010-041587 | 2/2010 |
| KR | 1020090085551 | 8/2009 |
| KR | 1020090113753 | 11/2009 |
| RU | 2009 121 265 | 12/2010 |
| WO | WO 2007/129539 | 11/2007 |
| WO | WO 2011/096765 | 8/2011 |
| WO | WO 2011/104142 | 9/2011 |
| WO | WO 2011/105093 | 9/2011 |
| WO | WO 2012/176458 | 12/2012 |

OTHER PUBLICATIONS

DVB Organization, "D21.1—Analysis on 3GPP E-MBMS/DVB-NGH Physical Layer Convergence", Release 1.0, Jan. 7, 2011.
European Search Report dated Oct. 27, 2014 issued in counterpart Appln. No. 12184110.0-1851.
Korean Office Action dated Dec. 9, 2016 issued in counterpart application No. 10-2012-0097839, 9 pages.
Matthew S. Gast, "802.11 Wireless Networks: The Definitive Guide", Creating & Administering Wireless Networks, 2nd Edition, Apr. 30, 2005, 33 pages.
European Search Report dated Sep. 29, 2015 issued in counterpart application No. 12184110.0-1851, 6 pages.
Russian Office Action dated Aug. 8, 2016 issued in counterpart application No. 2014114487/07, 18 pages.
Digital Video Broadcasting (DVB); Next Generation Broadcasting System to Handheld, Physical Layer Specification (DBV-NGH), DVB Document A160, Nov. 2012, 60 pages.
Chinese Office Action dated Apr. 20, 2016 issued in counterpart application No. 201280055641.6, 17 pages.
Japanese Office Action dated Feb. 15, 2016 issued in counterpart application No. 2014-529626, 8 pages.

* cited by examiner

|  | $T_{max} = 1$ | $T_{max} = 2$ |
|---|---|---|
| $N_{t\text{-}max} = 1$ | '00' | NA |
| $N_{t\text{-}max} = 2$ | '01' | '10' |

|  | $T_{max} = 1$ | $T_{max} = 2$ | $T_{max} = 3$ |
|---|---|---|---|
| $N_{t\text{-}max} = 1$ | '000' | NA | NA |
| $N_{t\text{-}max} = 2$ | '001' | '010' | NA |
| $N_{t\text{-}max} = 3$ | '011' | '100' | '101' |

FIG. 7

|  | S1 (3 bits) | S2 (3 bits) | Mixed bit | S2 ($n_{S3}$ bits) |
|---|---|---|---|---|
| DVB-T2 reserved space (incl. T2-lite) | 000 - 100 | FFT+GIh | x | - |
| Rsv | 101 | Reserved | | |
| NGH | 11 | FFT+GIh+WF | x | NT_T_xIxO |

FIG. 8

METHOD AND APPARATUS FOR TRANSMITTING/RECEIVING DATA STREAM IN WIRELESS SYSTEM

PRIORITY

This application claims priority under 35 U.S.C. § 119(a) to a U.K. Patent Application filed in the U.K. Intellectual Property Office on Sep. 13, 2011 and assigned Serial No. 1115833.4, and Korean Patent Application filed in the Korean Intellectual Property Office on Sep. 4, 2012 and assigned Serial No. 10-2012-0097839, the entire disclosures of which are incorporated herein by reference.

BACKGROUND OF THE INVENTION

1. Field of the Invention

The present invention relates generally to a wireless system, and more particularly, to a method and apparatus for transmitting/receiving data streams in a wireless system.

2. Description of the Related Art

A wireless system, such as a digital video broadcasting system, may transmit data in the form of a sequence of frames arranged in a frame structure. A digital video broadcasting system generally uses a Digital Video Broadcasting (DVB) standard, Advanced Televisions Systems Committee (ATSC), Integrated Services Digital Broadcasting (ISDB), or Digital Multimedia Broadcasting (DMB). Each frame typically includes a preamble section and a data section. The preamble section and the data section are time-multiplexed. The data section may be formed as a number of data streams, which may be referred to as Physical Layer Pipes (PLPs). The PLPs may carry, for example, a service such as a video channel provided to a user. Data or data streams from the frames are received using signaling information. The signaling may be referred to as physical layer signaling, or Layer 1 (L1) signaling. The signaling may indicate a modulation or coding scheme that is to be used to receive data. The signaling may, for example, indicate sections of a data field to be decoded, or information necessary for receiving data, such as the location of a data stream within the data section.

Referring to the DVB standard, DVB standard frame structures may provide physical slots within the DVB physical frame structure. For example, DVB Terrestrial $2^{nd}$ generation (DVB-T2), as a terrestrial standard broadcasting, has a super frame structure consisting of a number of frames. A slot, included in the super frame or each frame, does not transmit a DVB-T2 signal. The super frame is referred to as a Future Extension Frame (FEF). For example, FEF slots may be provided in addition to the parts of the frame structure, which are for transmission of signals intended for reception by conventional fixed DVB receivers.

It has been proposed to use the additional physical slots, such as the FEF slots, for the transmission of signals, such as, for example, signals intended for reception by handheld receivers. For example, UK patent application GB 1100901.6 relates to a system in which data streams may be mapped to logical frames, and the logical frames may be mapped to a sequence of additional physical slots to form a logical channel for transmitting the data streams. The sequence of additional physical slots may include slots within a transmission sequence of more than one radio frequency channel.

It may be desired to transmit a data stream encoded with a multi-transmitter encoding scheme, such as, for example, a Multiple Input Multiple Output (MIMO) encoding scheme or a Multiple Input Single Output (MISO) encoding scheme. However, not all radio frequency channels within the wireless system may be arranged for transmission from multiple antennas. Furthermore, the number of antennas arranged for transmission may vary amongst radio frequency channels. If a data stream encoded with a multi-transmitter encoding scheme is mapped to a logical channel formed from additional physical slots within a transmission sequence of more than one radio frequency channel, the multi-transmitter encoding scheme used by the data stream may not correspond with the number of transmit antennas and/or the multi-transmitter encoding scheme used on at least some of the radio frequency channels. As a result, a restriction may be placed on the formation of a logical channel, so that, for example, a logical channel may be limited to being formed from only those radio frequency channels that use the same multi-transmitter encoding scheme as the data stream.

SUMMARY OF THE INVENTION

The present invention has been made to address at least the above problems and/or disadvantages and to provide at least the advantages described below. Accordingly, an aspect of the present invention provides an apparatus and method for transmitting/receiving data streams in a wireless system.

In accordance with one aspect of the present invention, a method is provided for transmitting data streams in a wireless system. The data streams are received. The data streams are mapped to a physical slot. At least one frame that includes the physical slot is formed. The at least one frame is transmitted through at least one radio frequency. The physical slot includes bit information indicating a number of antennas transmitting the at least one frame.

In accordance with another aspect of the present invention, an apparatus is provided for transmitting data streams in a wireless system. The apparatus includes a receiver for receiving the data streams. The apparatus also includes a controller for mapping the data streams to a physical slot, and forming at least one frame that includes the physical slot. The apparatus additionally includes a transmitter for transmitting the at least one frame through at least one radio frequency. The physical slot includes bit information indicating a number of antennas transmitting the at least one frame.

In accordance with a further aspect of the present invention, a method is provided for receiving data streams in a wireless system. At least one frame is received through at least one radio frequency. A location of a physical slot included in each frame is obtained. The data streams allocated to the physical slot in the location are received. The physical slot includes bit information indicating a number of antennas transmitting the at least one frame.

In accordance with still another aspect of the present invention, an apparatus is provided for receiving data streams in a wireless system. The apparatus includes a receiver for receiving at least one frame through at least one radio frequency. The apparatus also includes a controller for detecting a location of a physical slot included in each frame, and obtaining the data streams allocated to the physical slot in the location. The physical slot includes bit information indicating a number of antennas transmitting the at least one frame.

BRIEF DESCRIPTION OF THE DRAWINGS

The above and other aspects, features and advantages of the present invention will be more apparent from the following detailed description when taken in conjunction with the accompanying drawings, in which:

FIG. 7 is a diagram illustrating a signaling scheme, according to an embodiment of the present invention;

FIG. 8 is a diagram illustrating a signaling scheme, according to an embodiment of the present invention.

DETAILED DESCRIPTION OF EMBODIMENTS OF THE PRESENT INVENTION

Figure 1:
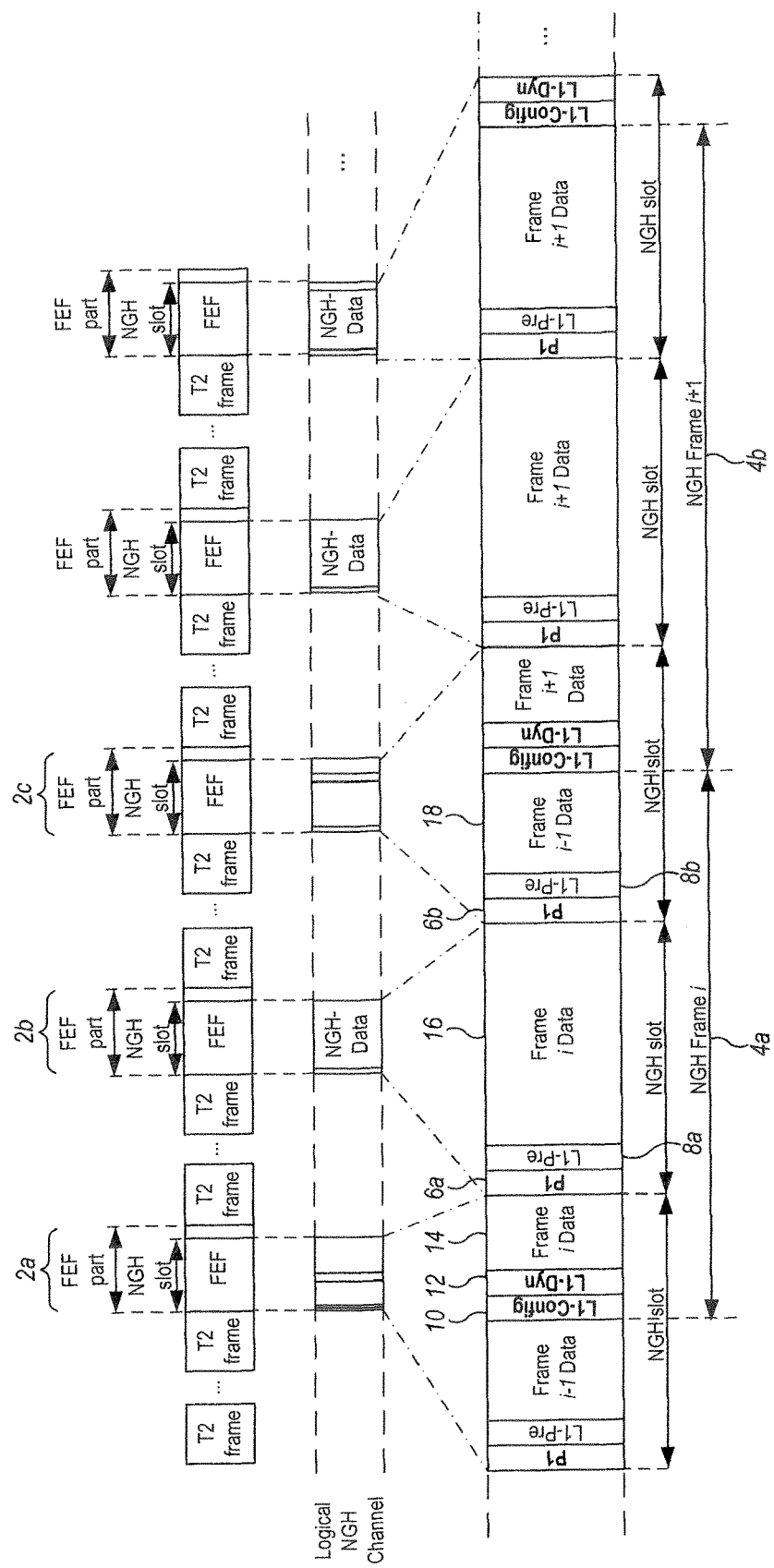
FIG. 1 is a diagram illustrating a mapping of logical frames to physical slots, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

By way of example, embodiments of the invention are described in the context of a Digital Video Broadcasting Next Generation Handheld (DVB-NGH) system, in which additional data for reception by DVB-NGH receivers is transmitted within FEF slots in the $2^{nd}$ generation terrestrial DVB-T2 system.

However, it will be understood that this is by way of example only and that other embodiments may involve other wireless broadcast systems or unicast/multicast systems. The embodiments of the present invention are not limited to the transmission of digital video signals.

FIG. 1 is a diagram illustrating a mapping of logical frames to physical slots, according to an embodiment of the present invention.

Referring to FIG. 1, DVB frame structures, for example, DVB-T2 system, may provide for FEF slots 2a, 2b, 2c within a transmission sequence of a radio frequency channel. The FEF slots 2a, 2b, 2c are referred to as an FEF part or an FEF unit. The FEF slots 2a, 2b, 2c occupy physical slots within the DVB physical frame structure, which may be reserved for future use and may not be used for transmitting a DVB-T2 signal. The FEF slots 2a, 2b, 2c may be provided in addition to the parts of the frame structure which are for transmission of signals intended for reception by conventional DVB-T2 receivers, which are shown in FIG. 1 as T2-frames.

It has been proposed to use the FEF slots which do not transmit conventional DVB-T2 data for the transmission of signals intended for reception by handheld receivers, for example, DVB-NGH receivers. As illustrated in FIG. 1, data streams, such as PLPs, may be mapped to logical frames 4a, 4b, and the logical frames 4a, 4b may be mapped to a sequence of additional physical slots, such as FEF slots 2a, 2b, 2c, to form a logical channel for transmitting the data streams. The sequence of FEF slots 2a, 2b, 2c may include slots within a transmission sequence of more than one radio frequency channel. As illustrated in FIG. 1, a logical NGH frame 4a is transmitted in at least two parts, and in this case three FEF slots 2a, 2b, 2c, so that the length of a logical NGH frame 4a may be greater than the length of a single one of the FEF slots, 2a, 2b, 2c. The logical NGH frame 4a may be arranged to have a lower proportion of signaling information to data capacity than would be the case if the length of the logical frame were limited by the length of an additional physical slot, in this case a FEF slot 2a, 2b, 2c. The two or more FEF slots may be within a transmission sequence for different radio frequency channels and the logical frames may be arranged to have a constant length, even though the length of additional physical slots in a sequence of additional physical slots may vary between the radio frequency channels, for example.

As shown in FIG. 1, a given logical frame 4a, typically includes signaling information and data. The signaling information typically includes sections "P1" 6a, 6b and "L1-pre" 8a, 8b, "L1-config" 10, "L1-dynamic" 12. Data sections 14, 16, 18 include PLPs. The PLPs may overlap in time and may be multiplexed in frequency, for example. The L1 config section 10 is a duration for L1-config signaling information. The L1-config signaling information typically carries information that is valid for each frame of the super-frame consisting of a number of frames, and is typically the same for each logical frame of the super-frame. The L1-dynamic information typically varies from logical frame to logical frame, and includes information for decoding the PLP within the logical frame. Typically, the L1-dynamic information may include a start address of the PLP, for example.

It may be desired to transmit a data stream encoded with a multi-transmitter encoding scheme, such as, for example, a MIMO encoding scheme or a MISO encoding scheme. However, not all radio frequency channels within the wireless communication system may be arranged for transmission from multiple antennas. Furthermore, the number of antennas arranged to transmit may vary amongst radio frequency channels.

Figure 2:
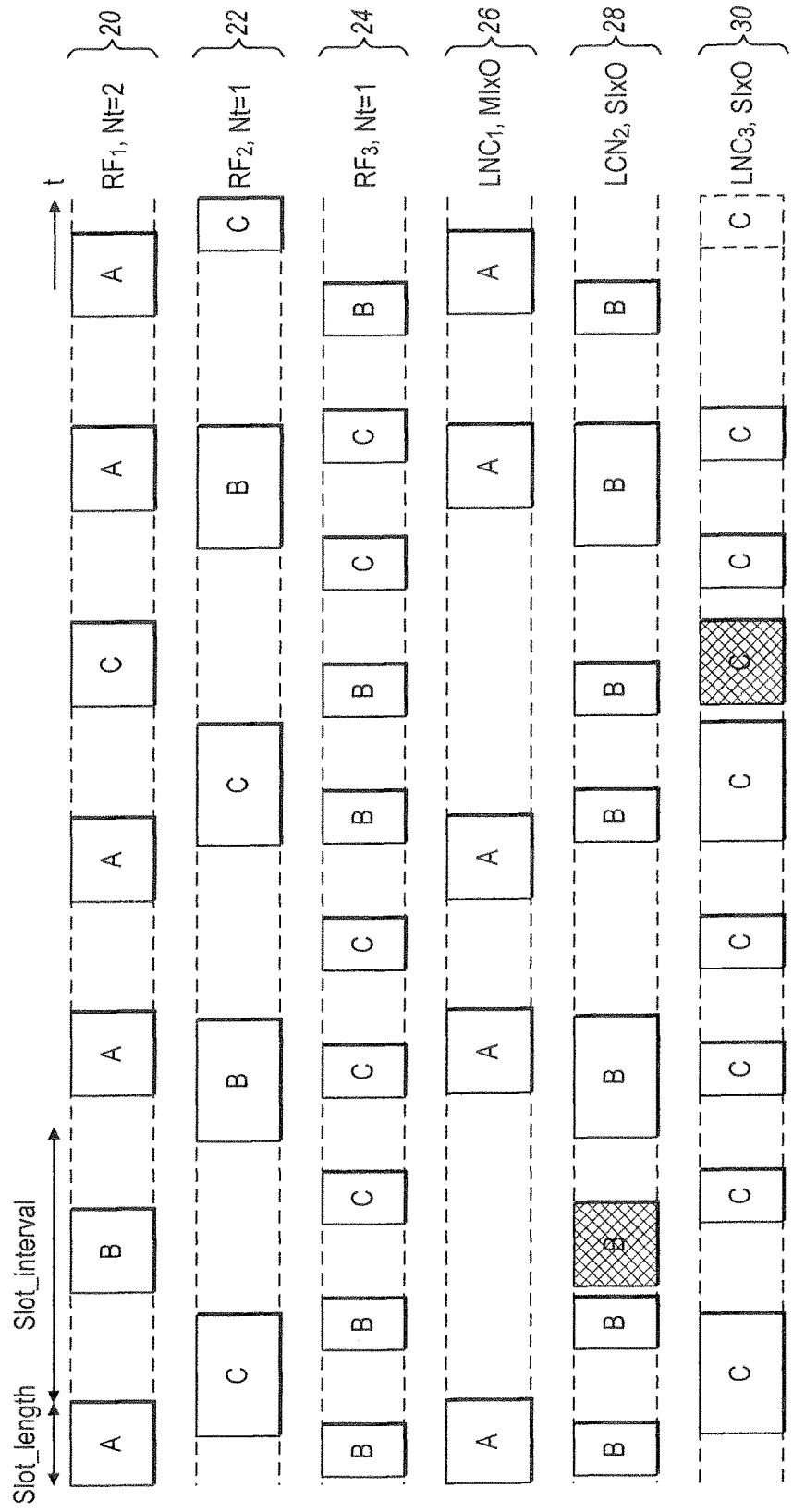
FIG. 2 is a diagram illustrating a mapping of logical channels to RF frequencies, according to an embodiment of the present invention.

FIG. 2 is a diagram illustrating a mapping of logical channels to RF frequencies, according to an embodiment of the invention.

Referring to FIG. 2, a first radio frequency channel $RF_1$ 20 is equipped with two antennas (Nt=2). Channels $RF_2$ 22 and $RF_3$ 24 are equipped with one antenna. In this embodiment of the present invention, logical channel $LNC_1$ 26 is arranged for carrying data streams with multi-transmitter encoding schemes (M1xO), e.g., MIMO or MISO encoding schemes. Logical channels $LNC_2$ 28 and $LNC_3$ 30 are arranged for carrying data streams with single transmitter encoding schemes (SIxO), e.g., Single Input, Multiple Output (SIMO) or SISO encoding schemes.

In an embodiment of the present invention, a first set of data streams, such as, for example, PLPs, are mapped onto a first series of logical frames, which are themselves mapped to a first sequence of additional physical slots, such as FEF slots, within several radio frequency channels to form a first logical channel for transmitting the first set of data streams. The logical channel may be referred to as a Logical NGH Channel (LNC). The first set of data streams may have a multi-transmitter encoding scheme, such as, for example, a MIMO or MISO encoding scheme, but not all of the first set of data streams need have the same multi-transmitter coding scheme. At least one of the first set of said plurality of data streams may have a multi-transmitter encoding scheme for a different number of transmit antennas than another of the first set. The first series of logical frames are transmitted in the first sequence of additional physical slots using the same pilot pattern for each of the slots in the first sequence of slots and for each of data streams. Sharing the same pilot pattern between data streams having different multi-transmitter coding schemes allows the data streams to be mapped to the same logical channel. The first pilot pattern may be selected to be appropriate to a multi-transmitter encoding scheme used by one of the first set of data streams requiring the highest number of pilot tones, so that each of the data streams may operate effectively, for example performing channel estimation, according to its respective multi-transmitter encoding scheme.

In an embodiment of the present invention, a second set of data streams are mapped onto a second series of logical frames, which are then mapped to a second sequence of additional physical slots, also within several radio frequency channels to form a second logical channel for transmitting the second set of data streams. The second series of logical frames are transmitted in the second sequence of additional physical slots, using a different, second, pilot pattern than the pilot pattern used to transmit the first series of logical frames, but using the same second pilot pattern for each of the slots in the second sequence of slots and for each of second set of data streams.

At least one additional physical slot of the first sequence may be a time slot within a transmission sequence of the same radio frequency channel as at least one additional physical slot of the second sequence. Additional physical slots on the same radio frequency channel may be arranged to use different pilot patterns. This allows two logical channels to use additional physical slots within the transmission sequence of the same radio frequency channel, even if the data streams carried by one logical channel have an encoding scheme using a different pilot pattern than that used by the data streams carried by the other logical channel. This may allow the provision of logical channels without the restriction that the logical channel is limited to being formed from only those radio frequency channels that use the same encoding scheme, for example, the multi-transmitter encoding scheme, as the data stream. Logical channels may be formed using radio frequency channels which, may be arranged in terms of number of transmitters, for a multi-transmitter encoding scheme different from that used for data streams to be transmitted using the logical channel. Conventionally, a pilot pattern used on a radio frequency channel may correspond with a number of transmitters available and a multi-transmitter encoding scheme used on that radio frequency channel.

The first sequence of additional physical slots is selected to be arranged for transmission by a number of antennas at least as great as the maximum number of transmit antennas required by a multi-transmitter encoding scheme used by any of the first set of data streams, so that each of the data streams may operate according to its respective multi-transmitter encoding scheme in each of the additional physical slots used for the logical channel for transmission of the data streams.

In an embodiment of the present invention, the mapping of the first set of data streams onto the first series of logical frames is arranged so that an integer number of space-time code blocks of a multi-transmitter encoding scheme are mapped to each OFDM symbol, so that space-time code blocks are not broken up, and elements of each code block are kept on the same OFDM symbol. This maintains the effectiveness of the space-time coding, for example, in terms of error rate performance as a function of signal to noise ratio. Also, the mapping of the first set of data streams onto the first series of logical frames may be arranged so that each OFDM symbol to which the first set of the plurality of data streams is mapped has a number of data subcarriers that is an integer multiple of a minimum common multiple of lengths of space-time code blocks used by the first set of said plurality of data streams. This ensures that an integer number of space-time code blocks of a multi-transmitter encoding scheme may be mapped to each OFDM symbol, so that no space-time code blocks need be split up between OFDM symbols, as doing so may reduce the effectiveness of the coding. The mapping of the first set of data streams onto the first series of logical frames may be arranged so that frequency interleaving results in mapping of a given space-time code block of a multi-transmitter encoding scheme to contiguous data subcarriers, so that the effectiveness of the space-time coding, for example in terms of error rate performance as a function of signal to noise ratio, may be maintained. The contiguous data subcarriers are contiguous before the insertion of pilot tones; a pilot tone may in principle be inserted between two of the contiguous data subcarriers.

In an embodiment of the present invention, the second pilot pattern is chosen to be appropriate to an encoding scheme used by at least one of the second set of data streams requiring the highest number of pilot tones, so that the first and second logical channels may each be arranged to use a respective pilot pattern appropriate to the set of data streams carried. Each of the second set of the plurality of data streams may be arranged for SISO transmission. The pilot pattern used for the second logical channel may be appropriate for SISO transmission, which typically involves a lower number of pilot tones, and so allows a larger number of subcarriers to be allocated for data transmission, increasing the efficiency of the data transmission scheme.

Multiple Input, single or multiple Output (MIXO) and Single Input, single or multiple Output (SIXO) encoding schemes may be multiplexed for the provision of logical channels, which may be referred to as LNC. A potential approach involves defining MIXO or SIXO at the slot level. This is motivated by the presence of L1-pre in every slot, and it is the L1-pre that signals the pilot pattern used in the additional physical slot. As a result, the logical frame, which may be a Logical NGH Frame (LNF), which is composed of multiple slots, can have different MIXO or SIXO parts. As a result, this approach would lead to one LNF having different pilot patterns, and since it is permitted for one PLP to span across two slots, different pilot patterns may affect then the same PLP; this may reduce transmission efficiency. As an alternative to this potential approach, in an embodiment of the present invention, the multiplexing of MIXO and SIXO may be performed at the LNC level, so that the pilot pattern may be defined at the LNC level. This may provide efficient multiplexing without affecting the flexibility for allowing some PLPs to be SIXO, since these can be allocated to a SIXO LNC.

A description of the multiplexing of MISO and MIMO PLPs in a given logical channel is provided below. In embodiments of the present invention, the same pilot pattern applies for MISO and MIMO, and the pilot pattern is determined by the higher number of transmit antennas of the encoding schemes used by the PLPs. In order to provide flexibility in selection of the best MIXO scheme suited for each PLP, the P2 symbols may then have different MIMO schemes, since different PLPs (signaling or data) might be carried (fully or partly) in P2 symbol. The usage of at least a pair-wise cell interleaver is needed, so that cells are not broken up. The pair-wise cell interleaver extends to a more general case where the pairing extends to more than 2 cells. With the formation of logical channels, the framing structure has an additional stage of slot building, and the mapping of cells to the slots and the cell interleaving take this stage into account.

In an embodiment of the present invention, a logical channel (LNC) enables a receiver to receive all the services/PLPs multiplexed on the LNC with a single tuner. When the service is transmitted over multiple PLPs (e.g., using SVC), all the PLPs of that service may be transmitted in the same LNC, since receiving multiple associated PLPs in different LNCs may require more than one tuner. In addition, in an embodiment of the invention, if an LNC contains a PLP using MIXO, the pilot pattern used over the whole LNC is selected to support MIXO. When the pilot scheme used in the LNC is MIXO, the multiplexing of SIXO and MIXO in the same LNC may be avoided, since the pilot scheme and pilot pattern used for MIXO may be inefficient when applied to SIXO. In an embodiment of the present invention, all NGH slots, that is to say additional physical slots, mapped to a MIXO LNC have the same number of transmitting antennas (Nt). The pilot pattern used in the LNC is typically defined in the L1-Pre part of the preamble at the beginning of each NGH slot.

FIG. 2 illustrates a first example of an allocation of additional physical layer slots on three radio frequency channels to three logical channels (LNCs) 26, 28, 30. There are 3 radio frequency channels $RF_1$ 20, $RF_2$ 22 and $RF_3$ 24, one of which has two transmit antennas (Nt=2) and two of which have one transmit antenna (Nt=1). When a SIXO LNC uses a slot in an RF with two transmitting antennas, a method of encoding SIXO transmission for transmission from multiple antennas, such as eSFN encoding, could be used so that encoding intended for use with a single transmitting antenna may be used for transmission from two antennas, for example, in the case the two antennas must be used (these slots are shaded in FIG. 2). eSFN is a method of encoding for SIXO when it is not desirable to inhibit transmission from one of the antennas, for example to avoid power fluctuations between transmitting antennas. eSFN is transparent to the receiver, and so it is typically not necessary to signal its use.

Figure 3:
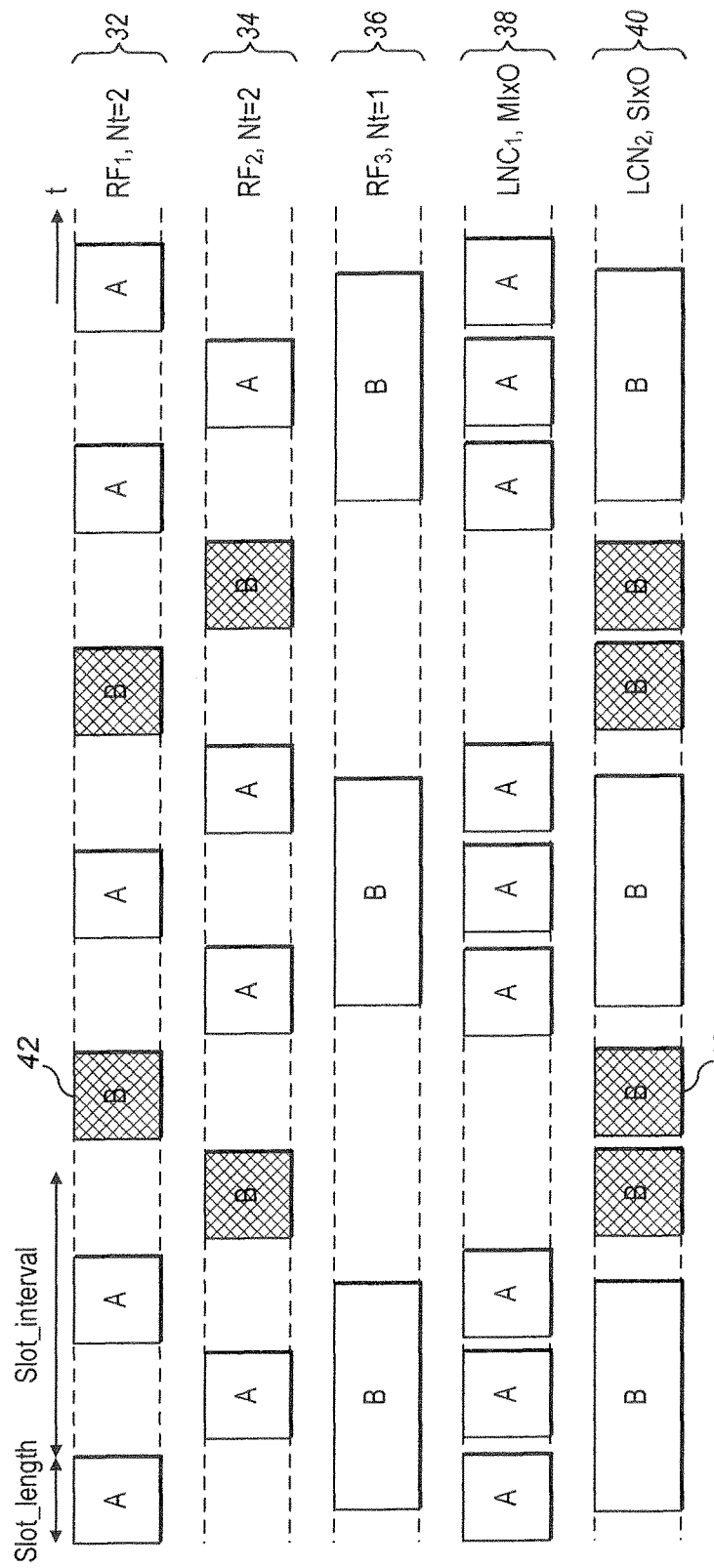
FIG. 3 is a diagram illustrating a mapping of logical channels to RF frequencies, according to an embodiment of the present invention.

FIG. 3 illustrates an embodiment of the present invention in which there are three radio frequency channels 32, 34, 36, two of which have two transmit antennas (Nt=2) and one of which have one transmit antenna (Nt=1). Two logical channels are shown, $LNC_1$ 38 carries MIXO data streams and $LNC_2$ 40 carries SIXO data streams. The shaded slots, e.g., slots indicated by reference numeral 42, are for transmission of SIXO using two antennas, so they may be eSFN encoded.

Figure 4:
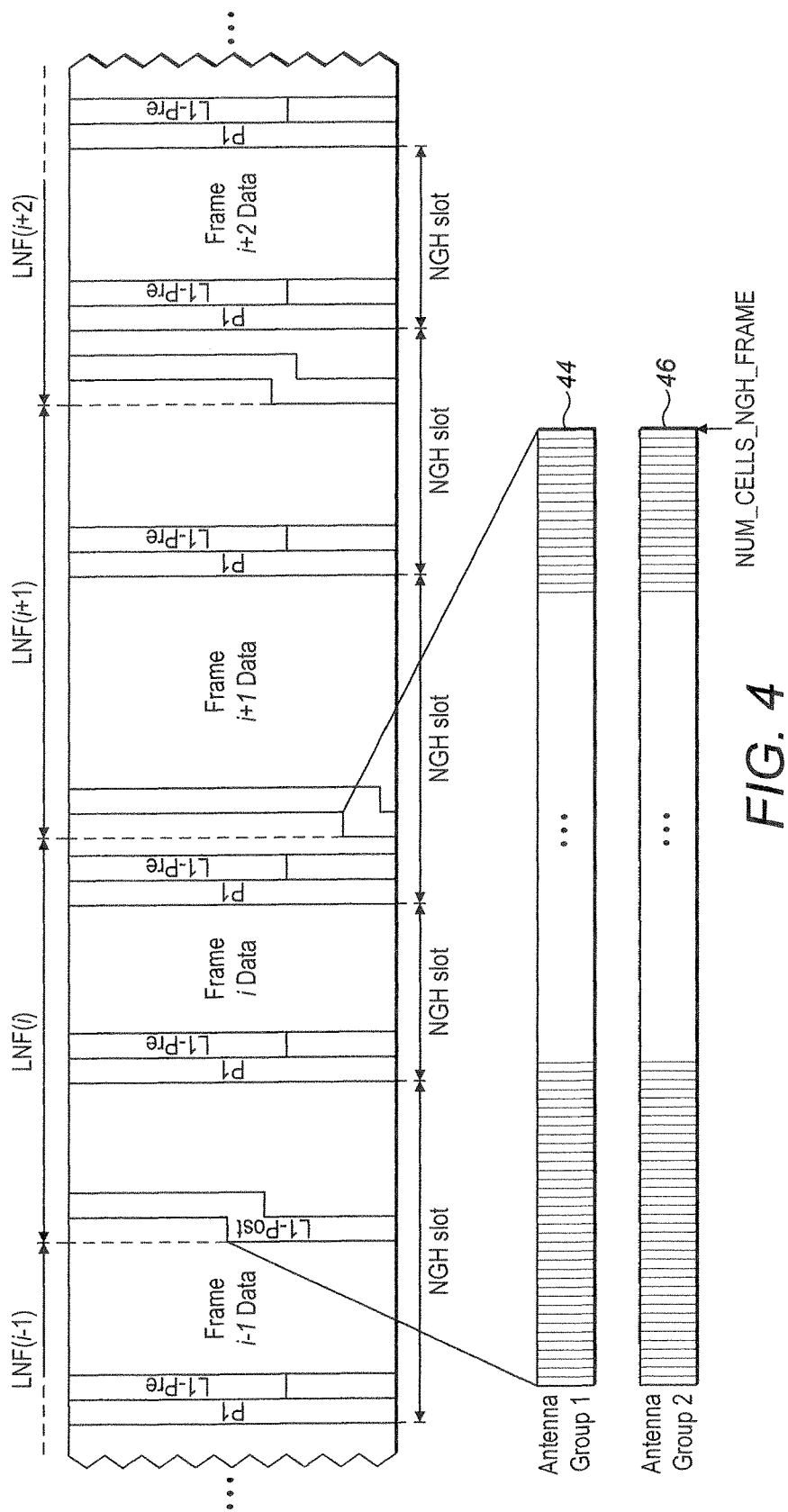
FIG. 4 is a diagram illustrating a mapping of antenna groups to a logical frame, according to an embodiment of the present invention.

FIG. 4 illustrates the case of MIMO. The logical channel (LNC) and a logical frame (LNF) are applied in similar way to the application for SIXO. The start of the LNF and the length of the L1-Post are signaled in the L1-Pre parts of the logical frame. The number of data cells in the LNF is typically fixed and signaled in the L1-Post. It can be seen that the logical frame is mapped to Antenna Group 1 44 and Antenna Group 2 46 for transmission.

Figure 5:
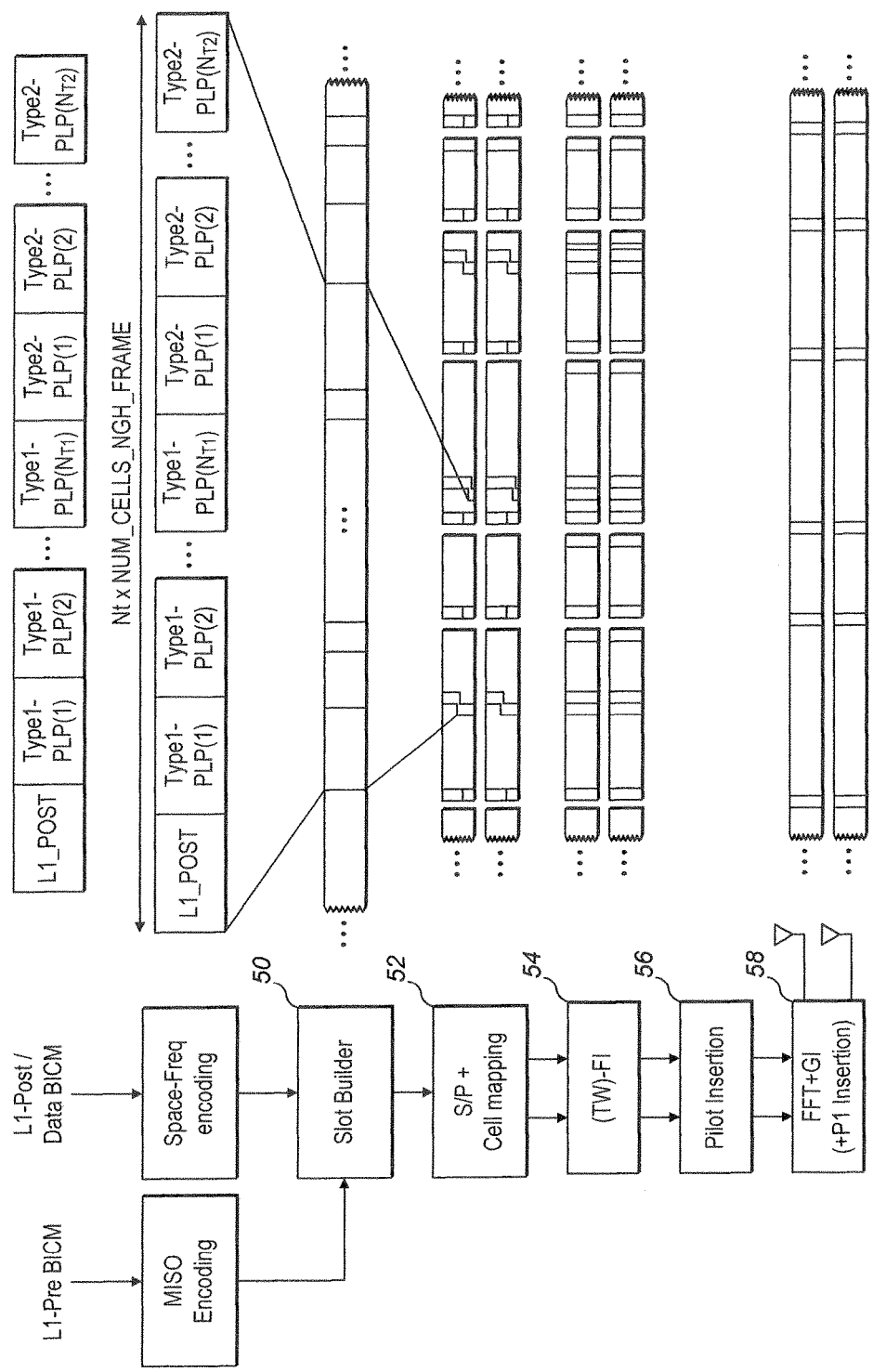
FIG. 5 is a diagram illustrating a frame building process, according to an embodiment of the present invention.

FIG. 5 illustrates a flow diagram of a process including slot building 50, serial/parallel conversion and cell mapping 52, T-wise (TW) Frequency Interleaving (FI) 54, pilot insertion 56, and Fast Fourier Transform (FFT) and Guard Interval (GI) and P1 symbol insertion 58, in an embodiment of the present invention. For each antenna, a stream of NUM_CELLS_NGH_FRAME cells is generated per LNF.

For Alamouti encoding, the SF codewords c(l) at the input of the slot builder are given by Equation (1) below.

$$c(l) = vec\{S\}, \quad S = \begin{bmatrix} a_l & b_l \\ -b_l^* & a_l^* \end{bmatrix} \Rightarrow c(l) = [\, a_l \;\; -b_l^* \;\; b_l \;\; a_l^* \,], \quad (1)$$
$$l = 0, \ldots, \text{PLP\_LENGTH}/2 - 1$$

For Enhanced Spatial Multiplexing (SM), the SF codewords will take the shape of Equation (2) below.

$$c(l) = vec\{S\},$$
$$S = \begin{bmatrix} 1 & 0 \\ 0 & e^{j\phi(k)} \end{bmatrix} \begin{bmatrix} \cos\phi & \sin\phi \\ \sin\phi & -\cos\phi \end{bmatrix} \begin{bmatrix} \sqrt{\alpha} & 0 \\ 0 & \sqrt{1-\alpha} \end{bmatrix} \begin{bmatrix} a_l \\ b_l \end{bmatrix} \quad (2)$$
$$\Rightarrow c(l) = [\, \chi_{l,0} \;\; \chi_{l,1} \,],$$
$$l = 0, \ldots, \text{PLP\_LENGTH}/2 - 1$$

Considering the Space-Frequency Encoding block, a 3×N hybrid scheme may use SF codewords as set forth in Equation (3), Equation (4) and Equation (5) below.

3×N Rate 1 Alamouti+QAM:

$$c(l) = vec\{S\}, \quad S = \begin{bmatrix} a_l & b_l^* \\ a_l & b_l^* \\ b_l & -a_l^* \end{bmatrix} \Rightarrow c(l) = [\, a_l \;\; a_l \;\; b_l \;\; b_l^* \;\; b_l^* \;\; -a_l^* \,], \quad (3)$$
$$l = 0, \ldots, \text{PLP\_LENGTH}/2 - 1$$

3×N Rate 3/2 L3-code:

$$c(l) = vec\{S\}, \quad (4)$$
$$S = \begin{bmatrix} c_l + d_l e^{j\pi/4} & b_l^* \\ c_l - d_l d^{j\pi/4} & b_l^* \\ b_l & -c_l^* + d_l^* e^{-j\pi/4} \end{bmatrix},$$
$$l = 0, \ldots, \text{PLP\_LENGTH}/3 - 1$$

3×N Rate 2 UTU Hybrid:

$$c(l) = vec\{S\}, \quad (5)$$
$$S = \begin{bmatrix} a_l + b_l e^{j\pi/4} & c_l^* + d_l e^{-j\pi/4} \\ a_l + b_l e^{j\pi/4} & c_l^* + d_l^* e^{-j\pi/4} \\ c_l + d_l e^{j\pi/4} & -a_l^* - b_l^* e^{-j\pi/4} \end{bmatrix},$$
$$l = 0, \ldots, \text{PLP\_LENGTH}/4 - 1$$

In the general case, any MIMO codeword using Space-Frequency block encoding will provide a codeword of size as set forth in Equation (6) below.

$$c(l) = \text{vec}\left\{\begin{bmatrix} a_{0,0} & a_{0,1} & \cdots & a_{0,T-1} \\ a_{1,0} & a_{1,1} & \cdots & a_{1,T-1} \\ \vdots & \vdots & \ddots & \vdots \\ a_{Nt-1,0} & a_{Nt-1,1} & \cdots & a_{Nt-1,T-1} \end{bmatrix}\right\}, \quad (6)$$

$l = 0, \ldots, \text{PLP\_LENGTH}/Q - 1,$

Q is the number of cells encapsulated into the same SF codeword. Any codeword will be of size $N_t \times T$, with $N_t$ being the number of transmit antennas and T the number of cells over which the channel should be constant (or as much as possible). The spatial rate is obtained as T/Q.

Considering the S/P+cell mapping block, as shown in FIG. 5, in an embodiment of the present invention, when there are multiple PLPs, each using its own SIxO/MIxO encoding scheme, the pilot pattern is determined by the PLP using the maximum number of transmitting antennas ($N_{tmax}$).

After the SF encoding of the PLPs, the cells generated after the XIXO encoding are separated according to its antenna group. This process may be handled by a Serial to Parallel (S/P) process, where each $N_t$ consecutive elements/cells are split into different paths.

In order to make the S/P process independent of the SF encoding, the SF codewords may be extended to be $N_{tmax} \times T$ by inserting rows with zeros during the encoding process.

Figure 6:
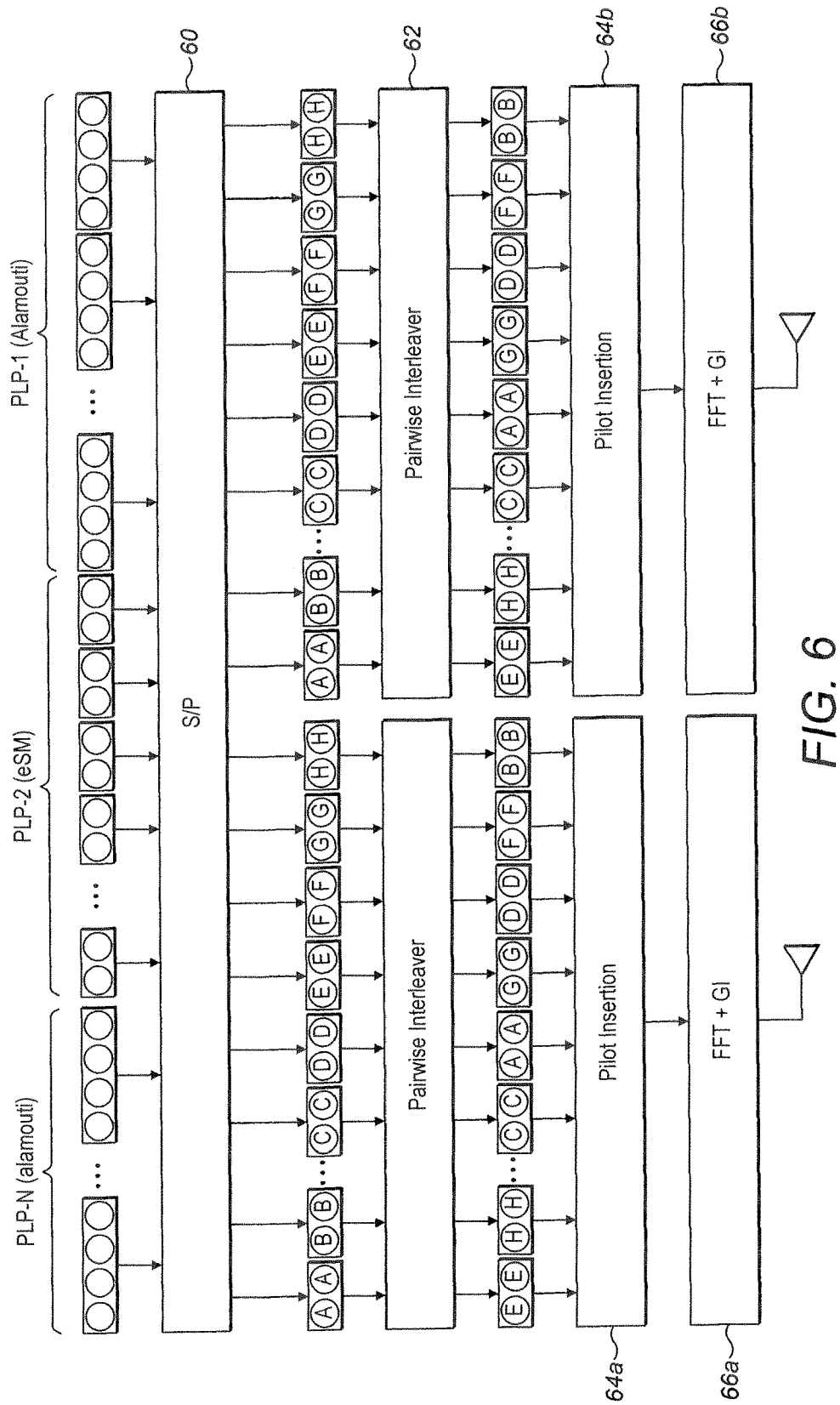
FIG. 6 is a diagram illustrating frequency interleaving, according to an embodiment of the present invention.

As illustrated by FIG. 6, after the cells in each SF codeword are split (i.e., S/P) 60 according to the antenna group, the cells from each antenna group may be grouped into M blocks of $T_{max}$ cells being $T_{max}$=mcm(T(i)), i=0 . . . NUM_PLP−1. The M blocks may be mapped to the respective cells in each slot, one slot being formed by one P2 symbol of $C_{P2} \times N_{P2}$ cells, $N_{data}$ data OFDM symbols of $C_{data} \times N_{data}$ cells and a (optional) slot closing symbol of $C_{FC} \times 1$ cells. The mapping of the M blocks may be carried out first in a frequency direction (column-wise) and then in a time direction. In an embodiment of the present invention, the number of blocks mapped per OFDM symbol (column-wise) is an integer:

$\{C_{P2}, C_{data}, C_{FC}\}/T_{max} \in Z$ where z is an integer.

Once the cells have been mapped into the slots, a T-wise frequency interleaving may be applied where the interleaving is applied over blocks of $T_{max}$ cells. Note that for T=2, this is a pair-wise interleaving 62, as illustrated in FIG. 6. However, T may be an integer greater than or equal to 2. Each block of $T_{max}$ cells are mapped onto adjacent subcarriers, typically to a contiguous block of data subcarriers, before the insertion of any pilot tones at pilot tone insertion blocks 64a, 64b. FIG. 6 shows the case of $T_{max}$=2. Space-time code words are kept in contiguous blocks. In FIG. 6, components of a given code word are identified by the same letter. Following pilot tone insertion 64a, 64b, an FFT is typically performed and a GI is inserted at 66a, 66b.

In order to extract the information from received signals regarding L1 Signaling and Data PLP, the receiver needs to know the number of antennas used for transmission as well as the $T_{max}$ value used during the T-wise frequency interleaving. These two parameters are typically related, and not all combinations are possible, so that a signaling format may be used, as illustrated in FIG. 7. The upper table of FIG. 7 relates to the case where transmission is by a maximum of two antennas, in which case it can be seen that two bits are needed to signal the information. The lower table relates to the case where transmission is by a maximum of three antennas, from which it can be seen that three bits are needed. This case may include hybrid Terrestrial/Satellite transmission (TER/SAT).

Assuming $n_{S3}$ bits are necessary, these bits can be signaled during the starting P1 symbol (as illustrated in FIG. 1), as illustrated in FIG. 8. In an alternative embodiment of the present invention, all bits available for NGH signaling can be combined into a single word of $4+n_{S3}$ bits which can be used to signal all the possible combinations of FFT size, Guard Interval, waveform, number of transmitting antennas, and the T-wise parameter.

Figure 9:
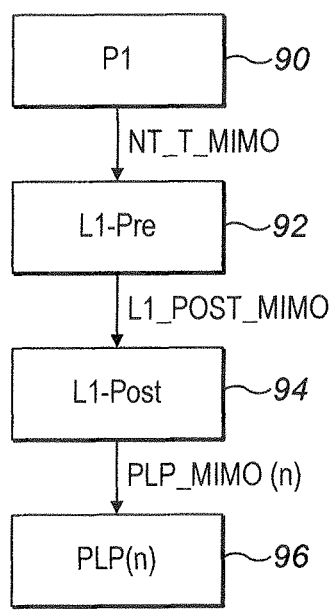
FIG. 9 is a diagram illustrating signaling stages, according to an embodiment of the present invention.

In an embodiment of the present invention, signaling is arranged to indicate to the receiver the type of space-frequency encoding that is used for the different associated PLPs, as illustrated in FIG. 9. P1 signaling 90 is typically transmitted at the start of a FEF slot. For an L1-Pre block 92, the MIMO encoding scheme is fixed and depends on the maximum number of transmitters, $N_{tmax}$. For example, if Ntmax=1, it may be deduced, in this example, that SIXO encoding is used, if Ntmax=2, that Alamouti encoding is used, and if Ntmax=3, then 3×N Rate 1 Alamouti+QAM encoding is used. In an embodiment of the present invention, the MIMO encoding of the L1-Post is signaled in the L1-Pre, as three bits that may be designated as L1 POST MIMO. The MIMO encoding of each PLP may be signaled in the PLP loop of the L1-Post 94 configurable part, as designated as PLP MIMO (3 bits) 96.

Embodiments of the present invention have been described in which mapping of additional physical layer slots to a logical channel depends on the configuration of the logical channel regarding a single input or multiple input encoding scheme. In embodiments of the present invention, a logical channel may use additional physical layer slots having a number of antennas of at least the maximum number of transmitting antennas used in the MIMO encoding. A single pilot pattern may be used for the whole logical channel adjusted to the maximum number of transmitting antennas. A method of multiplexing PLPs of different MIMO encoding schemes has been described in which each PLP can use a different MIMO encoding, including the L1 signaling. A mapping of MIMO codewords to the slots has been described, which allows T-wise frequency interleaving. A T-wise frequency interleaving scheme may be based on T2 frequency interleaving sequences. An L1 signaling scheme has been described that allows the receiver to detect the MIMO configuration of each logical channel (LNC) and extract the MIXO/SIXO data streams (PLPs).

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for transmitting a broadcast sequence in a wireless broadcast system, the method comprising:
   mapping a plurality of logical frames to a plurality of physical slots, each of which comprises indication bits indicating a number of cells used during frequency interleaving and a number of antennas allocated to a mapped radio frequency channel;
   forming the broadcast sequence that comprises the plurality of physical slots; and
   transmitting the broadcast sequence through one or more antennas, wherein a preamble section of each of the plurality of physical slots comprises P1 information and L1-pre information used for forming the plurality of physical slots to the plurality of logical frames, and wherein each of the plurality of logical frames comprises at least one physical layer pipe (PLP), and L1-post information used for decoding the at least one PLP.

2. The method of claim 1, wherein the indication bits are included in the preamble section.

3. The method of claim 1, wherein each of the plurality of physical slots comprises the preamble section and a data section, and wherein the data section comprises the at least one PLP and the L1-post information included in one or more logical frames among the plurality of logical frames.

4. The method of claim 3, wherein the P1 information and the L1-pre information are allocated in front of each of the plurality of physical slots.

5. An apparatus for transmitting a broadcast sequence in a wireless broadcast system, the apparatus comprising:

a controller configured to map a plurality of logical frames to a plurality of physical slots, and form the broadcast sequence that comprises the plurality of physical slots, each of which comprises indication bits indicating a number of cells used during frequency interleaving and a number of antennas allocated to a mapped radio frequency channel; and a transmitter configured to transmit the broadcast sequence through one or more antennas, wherein a preamble section of each of the plurality of physical slots comprises P1 information and L1-pre information used for forming the plurality of physical slots to the plurality of logical frames, and wherein each of the plurality of logical frames comprises at least one physical layer pipe (PLP), and L1-post information used for decoding the at least one PLP.

6. The apparatus of claim 5, wherein the indication bits are included in the preamble section.

7. The apparatus of claim 5, wherein each of the plurality of physical slots comprises the preamble section and a data section, and wherein the data section comprises the at least one PLP and the L1-post information included in one or more logical frames among the plurality of logical frames.

8. The apparatus of claim 5, wherein the P1 information and the L1-pre information are allocated in front of each of the plurality of physical slots.

9. A method for receiving a broadcast sequence in a wireless broadcast system, the method comprising:

receiving the broadcast sequence through one or more antennas;

obtaining indication bits comprised in each of a plurality of physical slots included in the broadcast sequence, wherein each of the plurality of physical slots comprises the indication bits indicating a number of cells used during frequency interleaving and a number of antennas allocated to a mapped radio frequency channel, and the plurality of physical slots comprise a plurality of logical frames;

determining the number of the antennas allocated to the mapped radio frequency channel and the number of the cells used during frequency interleaving based on the obtained indication bits; and decoding a data stream from each of the plurality of physical slots based on the obtained indication bits, wherein decoding the data stream comprises:

detecting P1 information and L1-pre information from a preamble section of each of the plurality of physical slots;

forming the plurality of physical slots to the plurality of logical frames based on the P1 information and the L1-pre information;

detecting L1-post information included in each of the plurality of logical frames; and decoding at least one physical layer pipe (PLP) included in a corresponding logical frame based on the detected L1-post information.

10. The method of claim 9, wherein the indication bits are included in the preamble section.

11. The method of claim 9, wherein each of the plurality of physical slots comprises the preamble section and a data section, and wherein the data section comprises the at least one PLP and the L1-post information included in one or more logical frames among the plurality of logical frames.

12. The method of claim 11, wherein the P1 information and the L1-pre information are allocated in front of each of the plurality of physical slots.

13. An apparatus for receiving a broadcast sequence in a wireless broadcast system, the apparatus comprising:

a receiver configured to receive the broadcast sequence through one or more antennas;

a controller configured to obtain indication bits comprised in each of a plurality of physical slots included in the broadcast sequence, determine a number of antennas allocated to a mapped radio frequency channel and a number of cells used during frequency interleaving based on the obtained indication bits, and decode a data stream from each of the plurality of physical slots based on the obtained indication bits, wherein each of the plurality of physical slots comprises the indication bits indicating the number of the cells used during frequency interleaving and the number of the antennas allocated to the mapped radio frequency channel, and the plurality of physical slots comprise a plurality of logical frames, wherein the controller is further configured to detect P1 information and L1-pre information from a preamble section of each of the plurality of physical slots, form the plurality of physical slots to the plurality of logical frames based on the P1 information and the L1-pre information, detect L1-post information included in each of the plurality of logical frames, and decode at least one physical layer pipe (PLP) included in a corresponding logical frame based on the detected L1-post information.

14. The apparatus of claim 13, wherein the indication bits are included in the preamble section.

15. The apparatus of claim 13, wherein each of the plurality of physical slots comprises the preamble section and a data section, and wherein the data section comprises the at least one PLP and the L1-post information included in one or more logical frames among the plurality of logical frames.

16. The apparatus of claim 15, wherein the P1 information and the L1-pre information are allocated in front of each of the plurality of physical slots.

* * * * *